US012670247B2

(12) United States Patent
Erickson et al.

(10) Patent No.: US 12,670,247 B2
(45) Date of Patent: Jun. 30, 2026

(54) DETERMINING INTEGRITY-DRIVEN ERROR TYPES IN MEMORY BUFFER DEVICES

(71) Applicant: Rambus Inc., San Jose, CA (US)

(72) Inventors: Evan Lawrence Erickson, Chapel Hill, NC (US); Helena Handschuh, Palo Alto, CA (US); Michael Alexander Hamburg, 's-Hertogenbosch (NL); Mark Evan Marson, Carlsbad, CA (US); Michael Raymond Miller, Raleigh, NC (US)

(73) Assignee: Rambus Inc., San Jose, CA (US)

( * ) Notice: Subject to any disclaimer, the term of this patent is extended or adjusted under 35 U.S.C. 154(b) by 384 days.

(21) Appl. No.: 18/202,517

(22) Filed: May 26, 2023

(65) Prior Publication Data

US 2023/0401311 A1 Dec. 14, 2023

Related U.S. Application Data

(60) Provisional application No. 63/351,797, filed on Jun. 13, 2022.

(51) Int. Cl.
 *G06F 21/55* (2013.01)
 *G06F 11/10* (2006.01)
(52) U.S. Cl.
 CPC ............ *G06F 21/552* (2013.01); *G06F 11/10* (2013.01)
(58) Field of Classification Search
 CPC ................................ G06F 21/552; G06F 11/10
 See application file for complete search history.

(56) References Cited

U.S. PATENT DOCUMENTS

| | | | |
|---|---|---|---|
| 9,460,312 B2 | 10/2016 | Brumley et al. | |
| 9,792,229 B2 | 10/2017 | Kishinevsky et al. | |
| 10,540,297 B2 | 1/2020 | Saileshwar et al. | |
| 12,235,720 B2 * | 2/2025 | Agarwal | G06F 11/10 |
| 2011/0141913 A1 * | 6/2011 | Clemens | H04L 41/0681 |
| | | | 370/242 |
| 2014/0136910 A1 * | 5/2014 | Goto | G06F 11/1666 |
| | | | 714/718 |
| 2014/0372707 A1 * | 12/2014 | Diep | G06F 3/0647 |
| | | | 711/135 |
| 2015/0278011 A1 * | 10/2015 | Keppel | G06F 11/106 |
| | | | 714/754 |

(Continued)

OTHER PUBLICATIONS

Saileshwar, Gururaj et al., "Synergey: Rethinking Secure-Memory Design for Error-Correcting Memories", 2018 IEEE International Symposium on High Performance Computer Architecture, DOI 10.1109/HPCA.2018.00046, pp. 454-465. 12 pages.

*Primary Examiner* — Catherine Thiaw
*Assistant Examiner* — Daniel Elahian
(74) *Attorney, Agent, or Firm* — Lowenstein Sandler LLP

(57) ABSTRACT

Technologies for detecting an error using a message authentication code (MAC) associated with cache line data and differentiating the error as having been caused by an attack on memory or a MAC verification failure caused by an ECC escape. One memory buffer device includes an in-line memory encryption (IME) circuit to generate the MACs and verify the MACs. Upon a MAC verification failure, the memory buffer device can analyze at least one of the historical MAC verification failures or historical ECC-corrected errors over time to determine if the error is caused by an attack on memory.

18 Claims, 6 Drawing Sheets

(56)  References Cited

U.S. PATENT DOCUMENTS

| | | | | |
|---|---|---|---|---|
| 2017/0131943 | A1* | 5/2017 | Le .......................... | G06F 3/0679 |
| 2018/0302105 | A1* | 10/2018 | Kalamatianos ..... | G06F 11/1064 |
| 2021/0064547 | A1* | 3/2021 | Chhabra ............. | G06F 11/1068 |
| 2021/0374056 | A1* | 12/2021 | Malladi ............... | G06F 13/4234 |
| 2022/0214909 | A1* | 7/2022 | Sahita ................... | H04L 9/0643 |
| 2022/0350672 | A1* | 11/2022 | Moyal ................... | H04L 9/3247 |

* cited by examiner

DETERMINING INTEGRITY-DRIVEN ERROR TYPES IN MEMORY BUFFER DEVICES

RELATED APPLICATIONS

This application claims priority to U.S. Provisional Patent Application No. 63/351,797, filed Jun. 13, 2022, the entire contents of which are incorporated herein by reference.

BACKGROUND

Modern computer systems generally include one or more memory devices, such as on a memory module. The memory module may include, for example, one or more random access memory (RAM) devices or dynamic random access memory (DRAM) devices. A memory device can include memory banks made up of memory cells that a memory controller or memory client accesses through a command interface and a data interface within the memory device. The memory module can include one or more volatile memory devices. The memory module can be a persistent memory module with one or more non-volatile memory (NVM) devices.

BRIEF DESCRIPTION OF THE DRAWINGS

The present disclosure is illustrated by way of example, and not by way of limitation, in the figures of the accompanying drawings.

DETAILED DESCRIPTION

Figure 1:
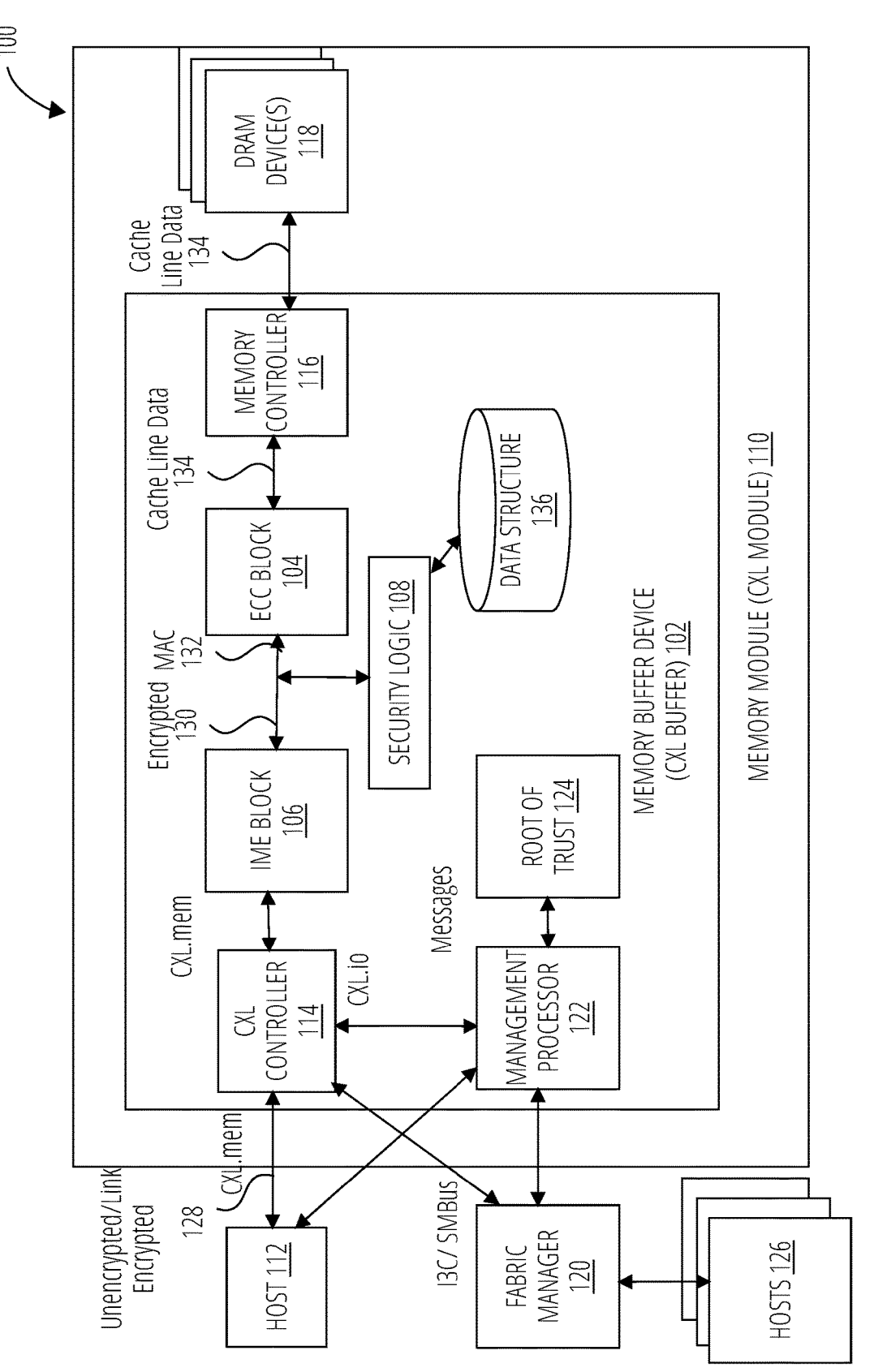
FIG. 1 is a block diagram of a memory system 100 with a memory module 110 with an in-line memory encryption (IME) block and security logic for differentiating integrity-driven error types according to at least one embodiment.

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In general, error correction codes (ECCs) (also referred to as error correcting codes) can be used to detect and correct errors when transferring data, such as when reading from memory or sending over a communication channel. A first entity can encode a message with redundant information in the form of an ECC, where the redundancy allows a second entity to detect a first specified number of errors that can occur in the message and correct a second specified number of errors. The ECC information is usually added to stored data to enable recovery of corrupted data or data in transit to enable recovery of changed bits caused by the communication channel. The second specified number of errors that can be corrected is determined by the design and size of the ECC. A stronger ECC requires more redundancy, possibly reducing available bandwidth or effective bit rate. ECC error escape probability is the probability that an error escapes ECC detection and correction. For example, a Reed-Solomon RS(40,32) code can provide the memory the ability to detect and correct multi-bit errors within up to 4 (16-bit) symbols with an ECC error escape probability of approximately 5e-15.

The Compute Express Link (CXL™) protocol provides the ability to store at least 2 to 4 bits of metadata at cache line granularity for use by a central processing unit (CPU) when resolving data coherency. Some CPUs could utilize an additional 16 bits of metadata for various applications, such as to provide memory security. If in-line memory encryption (IME) with cryptographic integrity is utilized, a message authentication code (MAC) will be stored as metadata and verified, often in parallel with decryption. A MAC is information or data used to cryptographically authenticate an origin of data being sent from one entity to another. A MAC, also known as a tag, can protect a message's data integrity (also known as authenticity), allowing an entity, having a key, to verify the authenticity of a message. Depending on the configuration of the memory system, a variety of ECC options could be appropriate, each with different ECC error escape probabilities (e.g., 4-symbol detect and 3-symbol correct with ECC error escape probability of approximately $5.4e^{-16}$ or 3-symbol correct with ECC error escape probability of approximately $3.5e^{-11}$). Depending on the CPU's metadata and security requirements, the number of ECC symbols may be reduced to provide space for metadata associated with cache line data.

Aspects of the present disclosure and embodiments address these problems and others by providing a device that utilizes both error correction coding (e.g., Reed-Solomon (RS) coding) and a cryptographic MAC to detect, track, and classify errors. Cryptographic integrity checks using a MAC can detect errors when transferring data, such as when a memory buffer device reads the data from memory. The data can be transferred as one or more messages or a data stream. In general, a MAC is intended to detect data manipulation by an adversary (referred to as an attack on memory). The MAC, however, can also be used to detect errors that escape ECC detection and correction. For example, a SHA3-256 hash produces a 256-bit MAC with a probability of failing to detect an error of approximately $8.6e^{-78}$. The 256-bit MAC can be truncated, for example, to 27 bits and have a MAC escape probability of approximately $7.5e^{-9}$. Thus, when using additional metadata with both ECC information with an ECC escape probability of $3.5e^{-11}$ (e.g., Reed-Solomon coding—RS(40,34) with 3 symbol correct) and a MAC with a MAC escape probability of $7.5e^{-9}$, a total escape probability using both would be approximately $2.63e^{-19}$. Total escape probability is the probability that an error escapes ECC detection and correction and MAC verification. The additional cache line metadata required, in this case, can be 32 bits with 27 bits of those bits used for the MAC. In another embodiment, the additional non-ECC metadata can be 16 bits (e.g., using RS(40,33) with 3-symbol correct, 4-symbol detect) with 11 bits for the MAC length, resulting in a total escape probability of approximately $2.59e^{-19}$.

If security requirements require encrypting data at rest and metadata for the CPU, aspects of the present disclosure can utilize the available metadata to provide a longer MAC, providing more benefit than maximizing the ECC's error detection capabilities. For example, an encryption method with an RS(40,34) code with a 27-bit MAC has approximately the same combined error escape probability as an RS(40,33) code with an 11-bit MAC with increased security. Regardless of the MAC length, using a MAC as a backstop against errors that escape ECC detection and correction can lead to a scenario where it is difficult to differentiate between an uncorrected error that escaped ECC and an attack where data has been manipulated. By differentiating between uncorrected errors and attacks, aspects of the present disclosure and embodiments can allow an uncorrected error to be detected without affecting the system stability while allowing for a more aggressive response to an apparent attack being detected.

In at least one embodiment, the memory module can be a CXL NVM module with secure backup capabilities. The CXL NVM module can include a CXL controller or a CXL memory expansion device (e.g., a CXL memory expander System on Chip (SoC)) that is coupled to DRAM (e.g., one or more volatile memory devices) and persistent storage memory (e.g., one or more NVM devices). The CXL memory expansion device can include a management processor. The CXL memory expansion device can include an ECC circuit to detect and correct errors in data read from memory or transferred between entities. The CXL memory expansion device can use an encryption circuit, such as an IME circuit, to encrypt the host's unencrypted data before storing it in the DRAM. The IME circuit can generate a MAC, and security logic can detect and track errors to differentiate the errors between those caused by attacks and those caused by ECC escapes. ECC escape occurs when the error is not detected or corrected by the ECC block. When a server is about to power down (e.g., a power-down event) or power loss to the CXL memory module is imminent, the CXL memory module can require that the DRAM contents be persisted to non-volatile memory (e.g., one or more non-volatile memory devices). For example, the server can send a notification signal, like a general protection fault (GPF) signal/command, power disable (PWRDIS) signal/command to the CXL memory module through a management interface, such as CXL.io, a management bus (e.g., System Management Bus (SMBus)), or a dedicated pin. For example, PWRDIS can be a dedicated pin that indicates a power disappearing event generated by a server system. The notification signal causes a backup of the encrypted DRAM contents to the persistent memory. This signal triggers an NVM backup process by the management processor to back up the encrypted DRAM contents to its persistent storage memory to avoid losing any data without causing security issues since the DRAM contents are encrypted, and the DRAM contents are not leaked by probing lines between the management processor and the external NVM controller.

In another embodiment, the memory module can be a CXL module without secure backup capabilities. The CXL module can include the CXL controller or the CXL memory expansion device coupled to DRAM and the management processor. The CXL memory expansion device can include the ECC circuit and the encryption circuit, such as an IME circuit, as described above. The IME circuit can generate a MAC, and security logic can detect and track errors to differentiate the errors between those caused by attacks and those caused by ECC escapes.

FIG. 1 is a block diagram of a memory system 100 with a memory module 110 with an IME block 106 and security logic 108 for differentiating integrity-driven error types according to at least one embodiment. In one embodiment, the memory module 110 includes a memory buffer device 102 and one or more DRAM device(s) 118. In one embodiment, the memory buffer device 102 is coupled to one or more DRAM device(s) 118 and a host 112. In another embodiment, the memory buffer device 102 is coupled to a fabric manager 120 operatively coupled to one or more hosts 126. In another embodiment, the memory buffer device 102 is coupled to both the host 112 and the fabric manager 120. A fabric manager is software executed by a device, such as a network device or switch, which manages connections between multiple entities in a network fabric. The network fabric is a network topology in which components pass data to each other through interconnecting switches. A network fabric includes hubs, switches, adapter endpoints, etc., between devices.

In one embodiment, the memory buffer device 102 includes an error correction code (ECC) block 104 (e.g., ECC circuit) to detect and correct errors in cache lines being read from the DRAM device(s) 118, and an IME block 106 to generate a message authentication code (MAC) for each cache line to provide cryptographic integrity on accesses to the respective cache line. The memory buffer device 102 also includes security logic 108 coupled to the ECC block 104 and the IME block 106. The security logic 108 can detect an error, uncorrected by the ECC block 104, in a cache line using a MAC of the cache line. The error can be detected by the ECC block 104 or the MAC verification by the IME block 106. The security logic 108 can differentiate the error as having been caused by i) a MAC verification failure caused by an ECC escape or ii) an attack on the cache line. The security logic 108 can differentiate the error by analyzing at least one of the historical MAC verification failures, or historical ECC corrected errors over time. The security logic 108 can perform, or cause another entity to perform, an action responsive to the error being caused by the attack. Action refers to any one or more operations performed due to the error being caused by an attack on memory. The one or more operations can be preventive actions, remedial actions, reporting actions, logging actions, or the like.

In a further embodiment, the memory buffer device 102 includes a CXL controller 114 and a memory controller 116. The CXL controller 114 is coupled to host 112 or multiple hosts 126 via the fabric manager 120. The memory controller 116 is coupled to the one or more DRAM devices 118. In a further embodiment, the memory buffer device 102 includes a management processor 122 and a root of trust 124. In at least one embodiment, the management processor 122 receives one or more management commands through a command interface between the host 112 (or fabric manager 120) and the management processor 122. In at least one embodiment, the memory buffer device 102 is implemented in a memory expansion device, such as a CXL memory expander SoC of a CXL NVM module or a CXL module. The memory buffer device 102 can encrypt unencrypted data 128 (e.g., plain text or cleartext user data) received from a host 112, using the IME block 106 to obtain encrypted data 130 before storing the encrypted data 130 in DRAM device(s) 118.

In some cases, the IME block 106 can receive data that is only encrypted for transmission across the link. The IME block 106 can generate a MAC 132 associated with the encrypted data 130. In at least one embodiment, the IME block 106 is an IME engine. In another embodiment, the IME block 106 is an encryption circuit or encryption logic. The ECC block 104 can receive the encrypted data 130 from the IME block 106. The ECC block 104 can generate ECC information associated with the encrypted data 130. The encrypted data 130, the MAC 132, and the ECC information can be organized as cache line data 134. The memory controller 116 can receive the cache line data 134 from the ECC block 104 and store the cache line data 134 in the DRAM device(s) 118. It should be noted that the memory buffer device 102 can receive unencrypted data but can also receive data that is encrypted as it traverses a link (e.g., the CXL link). This is usually link encryption, generally referred to in CXL as integrity and data encryption. The link encryption, in this case, would not persist to DRAM, as the CXL controller 114 in the memory module 110 can decrypt the link data and verify its integrity prior to the flow described herein, where the IME block 106 encrypts the data and generates the MAC 132. Although "unencrypted data 128" is used herein, in other embodiments, the data can be encrypted data that is encrypted by the memory buffer device 102 using a key only used for the link. Thus, cleartext data exists within the SoC after the CXL controller 114 and thus needs to be encrypted by the IME block 106 to provide encryption for data at rest. In other embodiments, the IME block 106 does not encrypt the data but generates the MAC 132.

In at least one embodiment, the CXL controller 114 includes two interfaces, a host memory interface (e.g., CXL.mem) and a management interface (e.g., CLX.io). The host memory interface can receive, from the host 112, one or more memory access commands of a remote memory protocol, such as Compute Express Link (CXL) protocol, Gen-Z, Open Memory Interface (OMI), Open Coherent Accelerator Processor Interface (OpenCAPI), or the like. The management interface can receive, from the host 112 or the fabric manager 120 by way of the management processor 122, one or more management commands of the remote memory protocol.

In at least one embodiment, the IME block 106 receives a data stream from a host 112 and encrypts the data stream into the encrypted data 130, and provides the encrypted data 130 to the ECC block 104 and the memory controller 116. The memory controller 116 stores the encrypted data 130 in the DRAM device(s) 118, along with the MAC 132 and the ECC information as the cache line data 134.

In at least one embodiment, during operation, security logic 108 is to track historical ECC corrected errors at cache line granularity or page granularity. In at least one embodiment, the security logic 108, responsive to an error being detected, writes a pattern to a cache line for which the error was detected and reads the pattern from the cache line to test the cache line for a second error. If a second error is detected, the error is likely caused by an ECC escape or, more likely, caused by the ECC escape than an attack on the memory. In at least one embodiment, a match of the pattern indicates that the error is caused by an attack on the memory or is more likely caused by the attack than an error caused by an ECC escape.

In another embodiment, security logic 108, responsive to an error being detected, migrates the cache line from a first physical location to a second physical location for subsequent monitoring. A subsequent error uncorrected by the ECC block 104 when accessing the migrated cache line indicates that the error is likely caused by an attack on the memory. In at least one embodiment, the migration of the cache line from the first physical location to the second physical location does not change an address used by a connected host 112.

In another embodiment, security logic 108, responsive to an error being detected, rearranges cache lines of the DRAM device(s) 118 for subsequent monitoring. A subsequent error uncorrected by the ECC block 104 indicates that the error is likely caused by an attack on the memory. For example, if the data is rearranged, the error location within the cache line should change for ECC or physical error, but if the location of the subsequent error is in the same position in the cache line (but in a different physical spot due to the rearrangement), it is more likely an attack. In at least one embodiment, the rearrangement of the cache lines does not change addresses used by a connected host 112.

In one embodiment, the memory buffer device 102 can include a data structure 136 associated with the security logic 108. The data structure 136 can store the information at a cache line granularity or a page granularity. The data structure 136 stores information about historical MAC verification failures over time, historical ECC corrected errors over time, or both. In at least one embodiment, the information identifies an address of the cache line, a timestamp of the error, and an error type. The information can include additional details. In at least one embodiment, the data structure 136 is a first-in-first-out (FIFO) buffer that stores a last N number of the historical MAC verification failures, where N is a positive integer greater than zero. The security logic 108 can query the FIFO buffer responsive to the error being detected in the cache line.

In at least one embodiment, the security logic 108 can write first data to the cache line, where the first data is a known pattern or is at least known by the memory buffer device 102. The security logic 108 reads second data from the cache line and determines whether the second data and the first data match. The security logic 108 determines the error as having likely been caused by the attack on the cache line responsive to the first data and the second data matching. In at least one embodiment, the data structure 136 can track the number of corrections to the cache line. In another embodiment, security logic 108 can track the number of corrections to the cache line as a value in the cache line.

In some embodiments, the memory module 110 has persistent memory backup capabilities where the management processor 122 can access the encrypted data 130 and transfer the encrypted data from the DRAM device(s) 118 to persistent memory (not illustrated in FIG. 1) in the event of a power-down event or a power-loss event. In at least one embodiment, the management processor 122 transfers the encrypted data to the persistent memory using an NVM controller (e.g., NAND controller). The encrypted data 130 in the persistent memory is considered data at rest.

The IME block 106 can include multiple encryption functions, such as a first encryption function that uses AES-256 encryption and a second encryption function that uses AES-512 encryption. The encryption functions can also provide cryptographic integrity in other embodiments, such as by using a message authentication code (MAC). In other embodiments, the cryptographic integrity can be provided separately from the encryption function. In some cases, the strength of the MAC and encryption algorithms can be different. The first encryption function can have a first encryption strength, such as AES-256 encryption. In at least one embodiment, the IME block 106 is an IME engine with two encryption functions. In another embodiment, the IME block 106 includes two separate IME engines, each having one of the two encryption functions. In another embodiment, the IME block 106 includes a first encryption circuit for the first encryption function and a second encryption circuit for the second encryption function. Alternatively, additional encryption functions can be implemented in the IME block 106. The memory controller 116 can receive the encrypted data 130 from the IME block 106 and store the encrypted data 130 in the DRAM device(s) 118.

In at least one embodiment, the MAC can be calculated on a first encrypted data stored with a second encrypted data as part of the algorithm (e.g., AES) or separately with a different algorithm. The memory controller 116 can receive the encrypted data 130 and MAC 132 from the IME block 106 and store the encrypted data 130 and MAC 132 in the DRAM device(s) 118. The host-to-unencrypted memory path can bypass the IME block 106 for all host transactions. The host-to-unencrypted memory path can still pass through the IME block 106 for generating the MAC 132. In at least one embodiment, the encryption can be serialized (e.g., a first time for memory (DRAM) storage and a second time with a second standard for persistent storage). As described herein, the keys can be stored in persistent memory storage. The persistent memory storage can be used to securely store and restore the encrypted contents of the DRAM to a previous state that can be accessed by the host and restore the keys necessary to decrypt this data. In this case, the persistent memory needs to be secure memory to not reveal the keys.

In at least one embodiment, the MAC 132 can be stored and transferred as metadata in connection with cache line data. The metadata can include a first portion with ECC information and a second portion with the MAC 132. In at least one embodiment, the metadata can be 32 bits, with 27 bits being used for the MAC 132. In another embodiment, the metadata can be 16 bits with 11 bits for the MAC 132. Cache line metadata can vary in the number of bits and in usage between the ECC information, host-specific metadata, device-specific metadata, and the MAC 132. In another embodiment, the metadata can include only the MAC 132. The metadata can be stored and transferred in side-band metadata or in-band metadata, as illustrated and described below with respect to FIG. 2.

Figure 2:
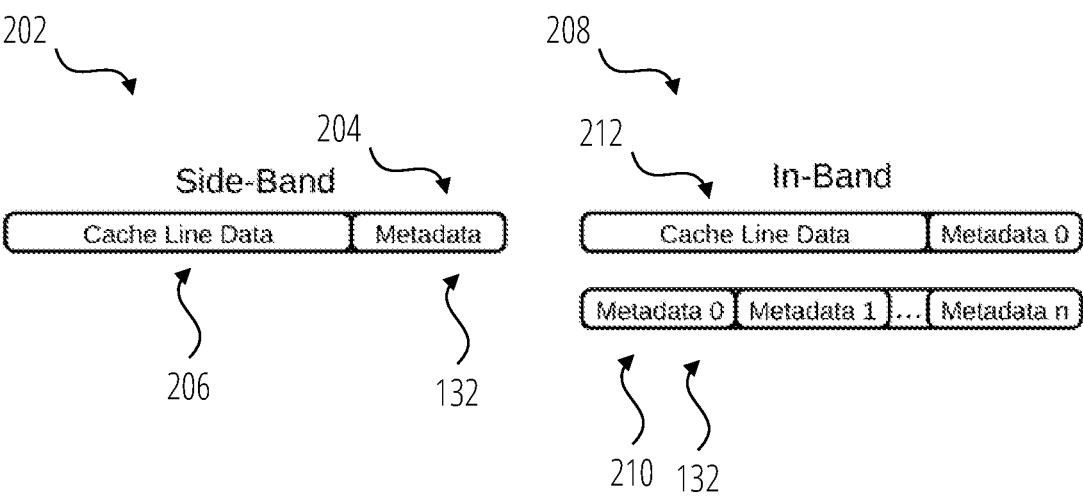
FIG. 2 illustrates a cache line in which a message authentication code (MAC) is stored and transferred in side-band metadata associated with cache line data and a cache line in which a MAC is stored and transferred in in-band metadata associated with cache line data, according to various embodiments.

FIG. 2 illustrates a cache line 202 in which a MAC 132 is stored and transferred in side-band metadata 204 associated with cache line data 206 and a cache line 208 in which a MAC 132 is stored and transferred in in-band metadata 210 associated with cache line data 212, according to various embodiments. In general, the metadata includes ECC symbols and the MAC 132. The metadata can be stored as side-band metadata 204 or in-band metadata 210. The side-band metadata 204 can be accessible when the cache line 202 is read from memory. The in-band metadata 210 can be stored in a location other than the cache line data 212, such as in a static RAM (SRAM) or DRAM. When the cache line 208 is read, an additional memory read would be performed to retrieve the in-band metadata 210, potentially including the MAC 132. The metadata can also store counters, such as counters used to prevent replay attacks and counters associated with the number of MAC verification failures.

Figure 3:
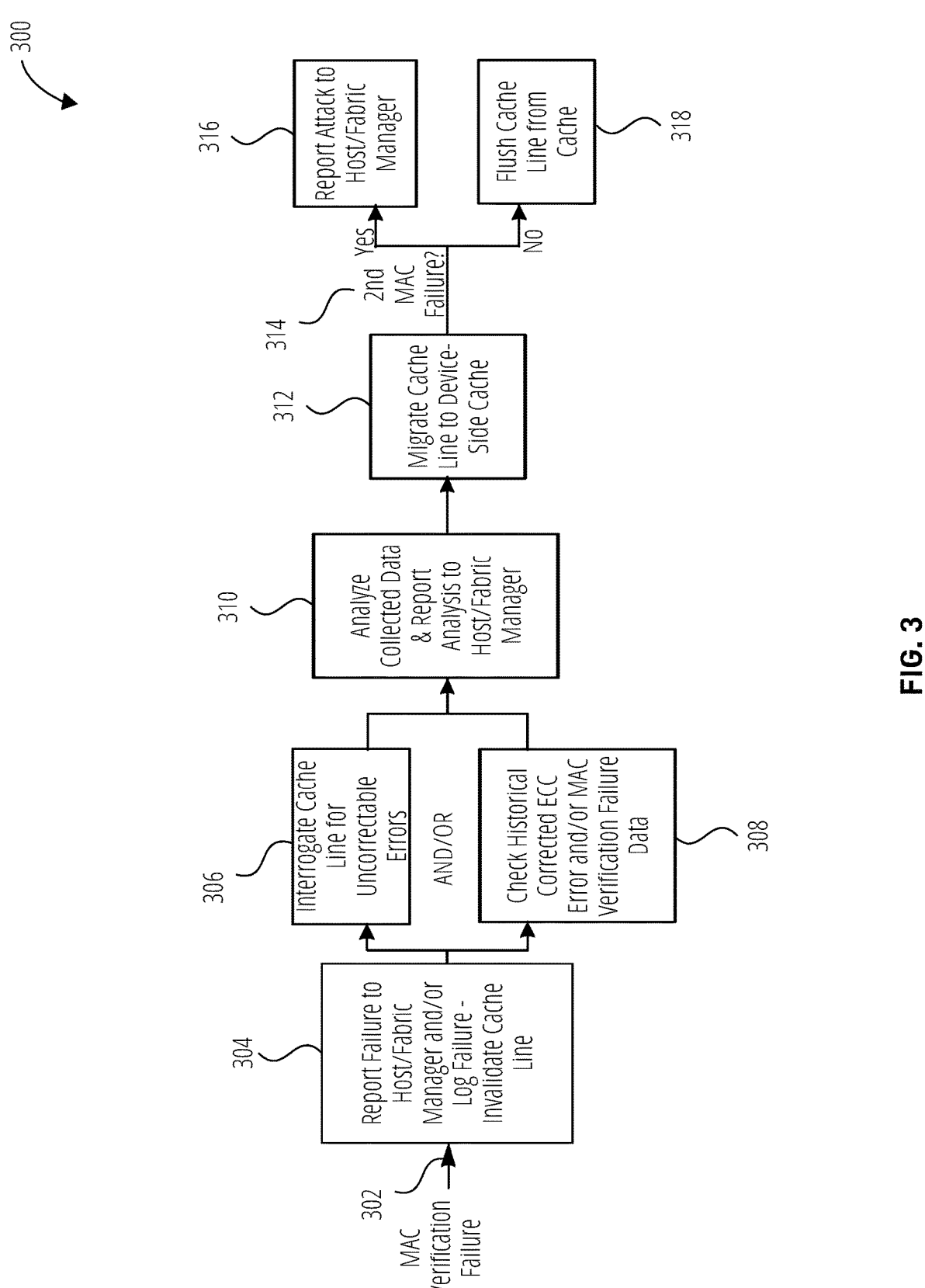
FIG. 3 is a process flow diagram of a method of detecting an uncorrected error and differentiating the error as having been caused by a MAC verification failure caused by an error correction code (ECC) escape or an attack on memory, according to at least one embodiment.

FIG. 3 is a process flow diagram of a method 300 of detecting an uncorrected error and differentiating the error as having been caused by a MAC verification failure caused by an ECC escape or an attack on memory, according to at least one embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by the memory buffer device 102 of FIG. 1, a memory expansion device, a memory module 110 of FIG. 1, an integrated circuit having the IME block 106, the ECC block 104, and the security logic 108 of FIG. 1, or the like.

Referring to FIG. 3, the method 300 begins with the processing logic receiving an indication 302 of a MAC verification failure. The processing logic can report the MAC verification failure to a host, a fabric manager, a log, or any combination thereof (block 304). The processing logic can invalidate the cache line containing the error such that the uncorrected cache line data will not be returned to a connected host (e.g., also referred to as poisoning the cache line). In at least one embodiment, the processing logic can interrogate the cache line for one or more subsequent uncorrectable errors (block 306). In at least one embodiment, the processing logic can further interrogate the cache line that failed MAC verification by performing a demand scrub-like operation in which data is written and read from the cache line to determine if subsequent uncorrected errors occur for the cache line.

In another embodiment, the processing logic can check a data structure containing information about historical ECC corrected errors, historical MAC verification failures, or both (block 308). In another embodiment, the processing logic can interrogate at block 306 and check at block 308. In at least one embodiment, to aid the host or fabric manager in determining a source of a MAC verification failure, the memory buffer device can track MAC verification failures and/or ECC corrections over time at a cache line granularity or a page granularity. For example, a device-global data structure can be used to track the MAC verification failures as they occur. For example, the global data structure can be implemented as a First-In-First-Out (FIFO) buffer queried at block 308 in response to the MAC verification failure. Tracking, at cache line granularity, a number of symbol errors corrected (e.g., 1, 2, and/or 3 symbol errors corrected) by the ECC block could also aid in error type differentiation. Since uncorrectable errors generally occur in DRAM cache lines that have progressively gotten worse over time, tracking correctable faults can monitor their progression over time to help differentiate between the error types. MAC verification failures that occur without prior historical ECC corrected errors would be suspected of being classified as an error caused by an attack.

The processing logic can analyze the collected data and report the analysis to a host or a fabric manager (block 310). The analysis by the memory buffer device of failures over time and by region of memory may help determine failures and differentiate the types of those failures. The processing logic can migrate the cache line to a device-side cache for subsequent monitoring. The processing logic can determine if a second MAC verification failure occurs on the cache line. For example, the processing logic can receive an indication 314 of the second MAC verification failure. If the second MAC verification failure occurs, the processing logic can report an attack to the host or fabric manager (block 316). If the second MAC verification failure does not occur, such as within a specified amount of time, the processing logic can flush the cache line from the device-side cache. In at least one embodiment, the errors and MAC verification failures can be logged and/or reported to the host or fabric manager.

In at least one embodiment, the processing logic can perform the method 300 according to a policy set up by the host or fabric manager. The memory buffer device can utilize the historical information and determine how to handle MAC verification failures as they occur according to a specified policy. The specified policy can be customized for different systems or for different regions of device memory and modified by the host or fabric manager. By differentiating between error types, the processing logic can allow multiple MAC verification failures before the memory buffer device determines that it is under attack.

In at least one embodiment, a memory module can virtualize a host's view of the device physical address (DPA) space by converting host physical addresses (HPAs) to a logical physical address (LPA) and then to DPA. The memory module can use the Host-Managed Device Memory (HDM) decoder and one or more device-private page tables. The virtualized device memory allows the memory buffer device to migrate a page from one DPA to another DPA without changing the page's HPA as used by the host. If a device-side cache is present, a cache line that experiences a MAC verification failure could be pinned in the device-side cache, changing its physical location for observation without affecting its address as seen by the host. If the pinned cache line experiences a second MAC verification failure, it provides strong evidence that the memory buffer device is under attack rather than the cache line experiencing reliability issues. In another embodiment, a page could undergo migration to a different location in DRAM. If the cache line experiences a second MAC verification failure in DRAM, it provides strong evidence that the memory buffer device is under attack rather than the cache line experiencing reliability issues. After a MAC verification failure, the memory buffer device could differentiate between an attack and an uncorrected error by utilizing the device's MAC verification failure history, ECC correction history at cache line granularity, and potentially by migrating cache lines. This can allow the memory buffer device to support multiple modes of operation and reporting after a MAC verification failure.

Figure 4:
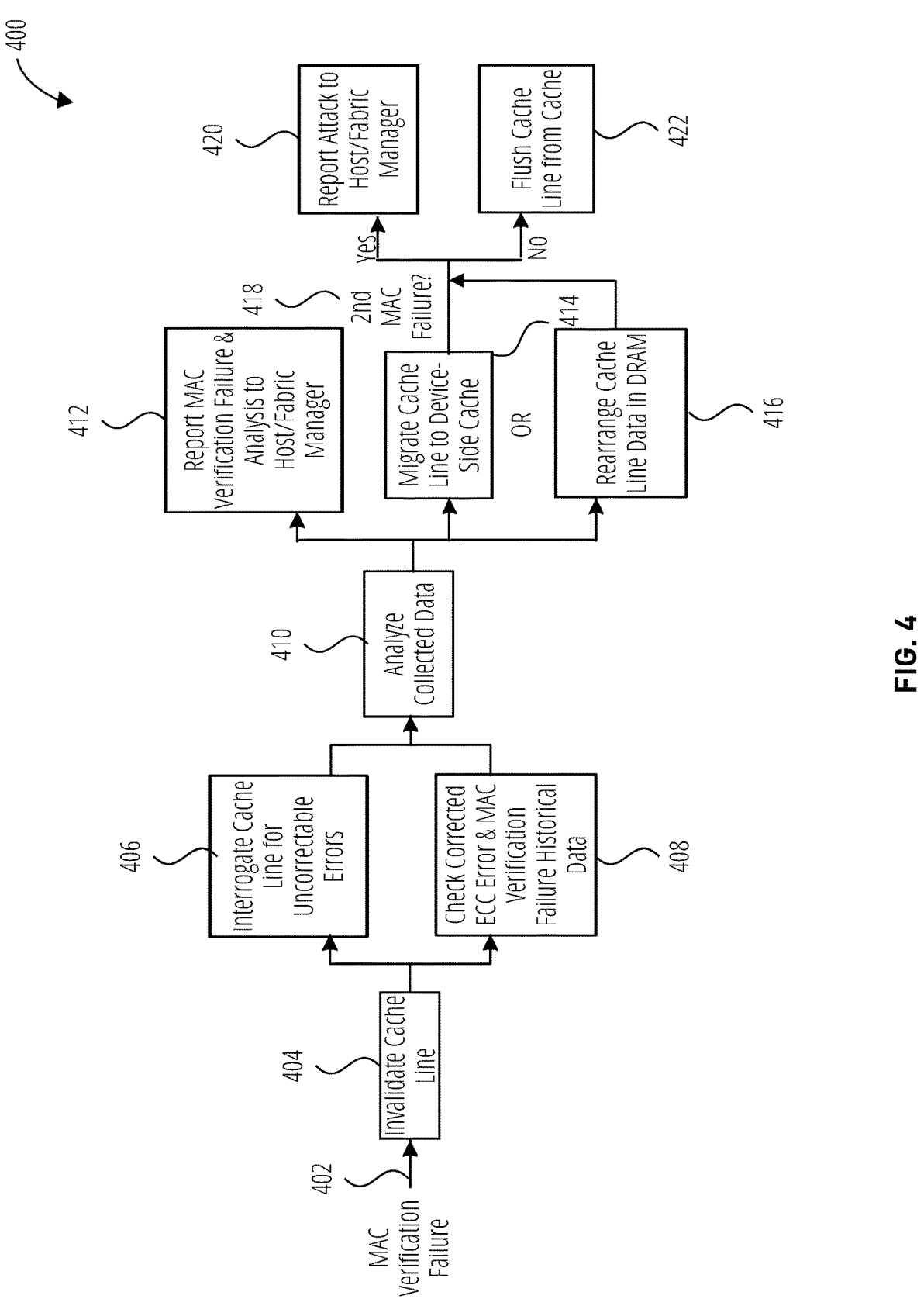
FIG. 4 is a process flow diagram of a method of detecting an uncorrected error and differentiating the error as having been caused by a MAC verification failure caused by an ECC escape or an attack on memory, according to at least one embodiment.

FIG. 4 is a process flow diagram of a method 400 of detecting an uncorrected error and differentiating the error as having been caused by a MAC verification failure caused by an ECC escape or an attack on memory, according to at least one embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the memory buffer device 102 of FIG. 1, a memory expansion device, a memory module 110 of FIG. 1, an integrated circuit having the IME block 106, the ECC block 104, and the security logic 108 of FIG. 1, or the like.

Referring to FIG. 4, the method 400 begins with the processing logic receiving an indication 402 of a MAC verification failure. The processing logic can invalidate the cache line (block 404) (e.g., invalidate cache line). The processing logic can refrain from reporting the MAC verification failure to a host, a fabric manager, a log, or any combination thereof at this point. In at least one embodiment, the processing logic can interrogate the cache line for one or more subsequent uncorrectable errors (block 406). In at least one embodiment, the processing logic can further interrogate the cache line that failed MAC verification by performing a demand scrub-like operation in which data is written and read from the cache line to determine if subsequent uncorrected errors occur for the cache line.

In another embodiment, the processing logic can check a data structure containing information about historical ECC corrected errors, historical MAC verification failures, or both (block 408). In another embodiment, the processing logic can interrogate at block 406 and check at block 408. In at least one embodiment, to aid the host or fabric manager in determining a source of a MAC verification failure, the memory buffer device can track MAC verification failures and/or historical ECC corrected errors (e.g., ECC corrections) over time at a cache line granularity or a page granularity. For example, a device-global data structure can be used to track the MAC verification failures as they occur. For example, the global data structure can be implemented as a FIFO buffer queried at block 408 in response to the MAC verification failure. Tracking at cache line granularity of a number of symbol errors corrected (e.g., 1, 2, and/or 3 symbol errors corrected) by the ECC block could also aid in error type differentiation. Since uncorrectable errors generally occur in DRAM cache lines that have progressively gotten worse over time, tracking correctable faults can monitor their progression over time to help differentiate between the error types. MAC verification failures that occur without prior historical ECC corrected errors would be suspected of being classified as an error caused by an attack.

The processing logic can analyze the collected data (block 410). The analysis by the memory buffer device of failures over time and by region of memory may help determine failures and differentiate the types of those failures. The processing logic can report the MAC verification failure and the analysis to a host or a fabric manager (block 412). Alternatively, or in combination, the processing logic can migrate the cache line to a device-side cache for subsequent monitoring (block 414). The processing logic can determine if one or more subsequent MAC verification failures occur on the cache line. For example, the processing logic can receive an indication 418 of the one or more subsequent MAC verification failures. If the one or more subsequent MAC verification failures occur, the processing logic can report an attack to the host or fabric manager (block 420). If the one or more subsequent MAC verification failures do not occur, such as within a specified amount of time, the processing logic can flush the cache line from the device-side cache (block 422).

In another embodiment, the processing logic can report the one or more subsequent MAC verification failures and the analysis to a host or a fabric manager (block 412) and rearrange the cache line data in DRAM (block 416). The processing logic can determine if one or more subsequent MAC verification failures occur on the cache line. If rearranging the data has the error in the same physical location, then it seems likely to be a DRAM/ECC error and not a MAC error. For example, the processing logic can receive an indication 418 of the one or more subsequent MAC verification failures. If the one or more subsequent MAC verification failures occur, the processing logic can report an attack to the host or fabric manager (block 420). In another embodiment, a certain threshold can be defined to determine whether to report an attack. For example, if more than two errors are detected, then the attack can be reported. Alternatively, other conditions can be defined, such as a predefined threshold of MAC verification failures (either for a specific cache line or across the device in a period of time). The threshold can possibly be set by the host or the fabric manager in a manner that could vary between different hosts or different regions of memory. If the one or more subsequent MAC verification failures do not occur, such as within a specified amount of time, the processing logic can flush the cache line from the device-side cache (block 422). In at least one embodiment, the errors and MAC verification failures can be logged and/or reported to the host or fabric manager. The errors can be reported as they are detected or reported as a batch or at specified time intervals.

In at least one embodiment, after a MAC verification failure, the memory buffer device could differentiate between an attack and an uncorrected error by utilizing the device MAC verification failure history, ECC correction history at cache line granularity, and potentially by migrating cache lines. Using the historical information allows the memory buffer device to support multiple modes of operation and reporting after a MAC verification failure.

In at least one embodiment, the processing logic can perform the method 400 according to a policy that is set up by the host or fabric manager. The memory buffer device can utilize the historical information and determine how to handle MAC verification failures as they occur according to a specified policy. The specified policy can be customized for different systems and modified by the host or fabric manager. By differentiating between error types, the processing logic can allow multiple MAC verification failures before the memory buffer device determines that it is under attack.

In at least one embodiment, a memory module can virtualize a host's view of the DPA space by converting HPAs to an LPA and then to DPA. The memory module can use the HDM decoder and one or more device-private page tables. The virtualized device memory allows the memory buffer device to migrate a page from one DPA to another DPA without changing the page's HPA as used by the host. If a device-side cache is present, a cache line that experiences a MAC verification failure could be pinned in the device-side cache, changing its physical location for observation without affecting its address as seen by the host. If the pinned cache line experiences a second MAC verification failure, it provides strong evidence that the memory buffer device is under attack rather than the cache line experiencing reliability issues. In another embodiment, a page could undergo migration to a different location in DRAM. If the cache line experiences a second MAC verification failure in DRAM, it provides strong evidence that the memory buffer device is under attack rather than the cache line experiencing reliability issues. After a MAC verification failure, the memory buffer device could differentiate between an attack and an uncorrected error by utilizing the device's MAC verification failure history, ECC correction history at cache line granularity, and potentially by migrating cache lines. This can allow the memory buffer device to support multiple modes of operation and reporting after a MAC verification failure.

In another embodiment, without a device-side cache, a single metadata bit could be used to indicate an alternative mapping of the cache line to DRAM, allowing a subsequent MAC verification error to be more easily differentiated from an ECC error.

In another embodiment, a memory buffer device utilizes MACs to provide cryptographic integrity on cache line accesses and detect errors uncorrected by ECC. The memory buffer device differentiates between MAC failures caused by ECC escape and an attack on memory by analyzing MAC verification failures over time.

In a further embodiment, the memory buffer device tracks ECC-corrected errors at cache line granularity. In one embodiment, the memory buffer device writes one or more patterns to the cache line that failed verification and reads them to test the memory. These tests help the memory buffer device differentiate the error types.

In another embodiment, the memory buffer device migrates cache lines that fail MAC verification to a different physical location for further monitoring. In at least one embodiment, the device-driven migration of cache line(s) to a different device physical address does not affect the address seen by the connected host.

In another embodiment, the memory buffer device rearranges cache line data stored in DRAM to aid further monitoring.

In another embodiment, a FIFO buffer tracks the most recent ECC error/MAC verification failures. The most recent ECC error/MAC verification failures can aid in determining possible causes of errors. The memory buffer device can perform one or more actions responsive to a MAC verification failure. In at least one embodiment, the actions taken by the memory buffer device in response to the detection of a MAC verification failure are controlled by policies.

In at least one embodiment, the memory buffer device is a CXL buffer that supports the CXL protocol. In another embodiment, the memory buffer device supports other remote memory protocols.

Figure 5:
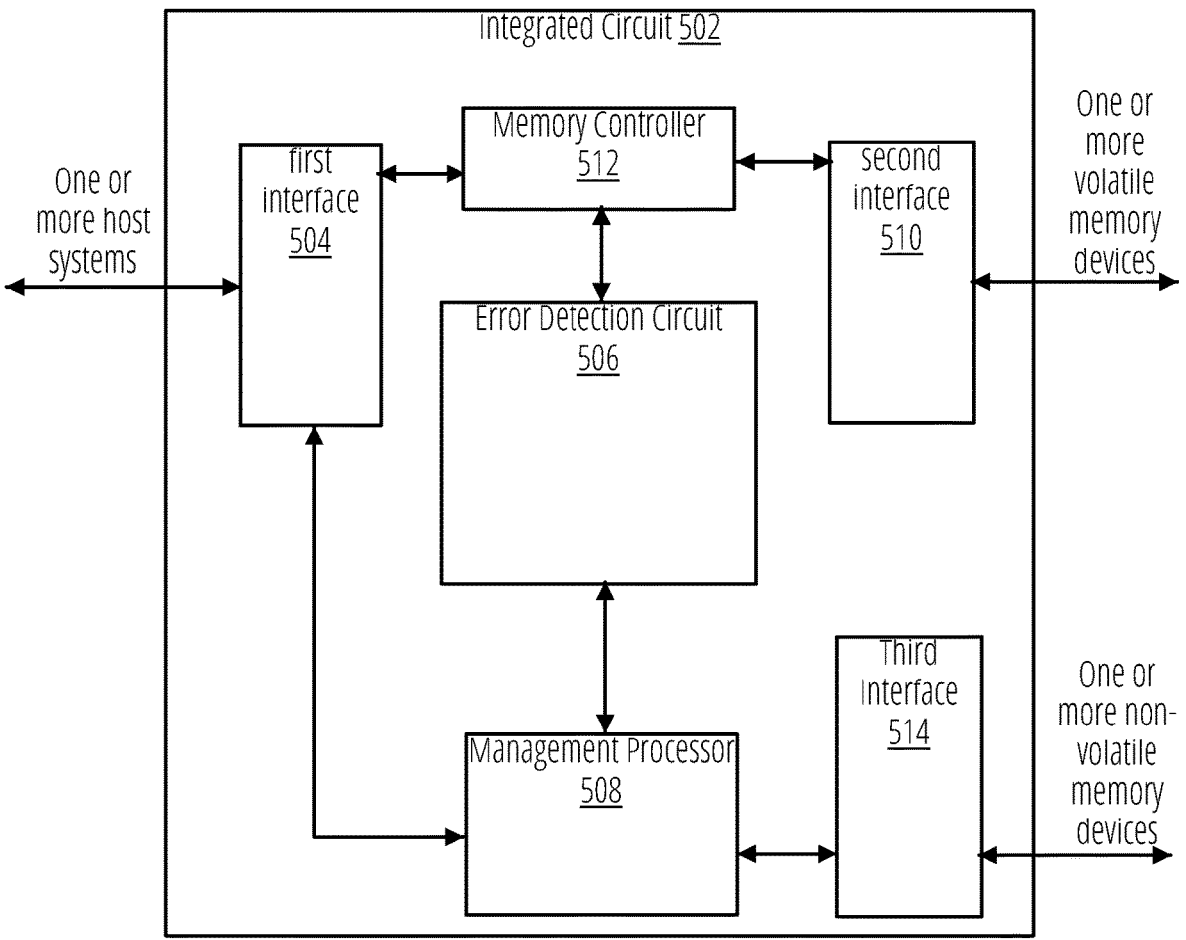
FIG. 5 is a block diagram of an integrated circuit with a memory controller, an error detection circuit, and a management processor according to at least one embodiment.

FIG. 5 is a block diagram of an integrated circuit 502 with a memory controller 512, an error detection circuit 506, and a management processor 508 according to at least one embodiment. In at least one embodiment, the integrated circuit 502 is a controller device that can communicate with one or more host systems (not illustrated in FIG. 5) using a cache-coherent interconnect protocol (e.g., the CXL protocol). The integrated circuit 502 can be a device that implements the CXL™ standard. The CXL™ protocol can be built upon physical and electrical interfaces of a PCI Express® standard with protocols that establish coherency, simplify the software stack, and maintain compatibility with existing standards. The integrated circuit 502 includes a first interface 504 coupled to the one or more host systems or a fabric manager, a second interface 510 coupled to one or more volatile memory devices (not illustrated in FIG. 5), and an optional third interface 514 coupled to one or more non-volatile memory devices (not illustrated in FIG. 5). The one or more volatile memory devices can be DRAM devices. The integrated circuit 502 can be part of a single-host memory expansion integrated circuit, a multi-host memory pooling integrated circuit coupled to multiple host systems over multiple cache-coherent interconnects, or the like.

In one embodiment, the memory controller 512 receives data from a host over the first interface 504 or a volatile memory device over the second interface 510. The memory controller 512 can send the data or a copy of the data to the error detection circuit 506. The error detection circuit 506 determines whether the data has errors. In at least one embodiment, the error detection circuit 506 includes an ECC block and an IME block, as described herein. The error can be an error that is detected and/or corrected by the ECC block. The error can escape the ECC block as an uncorrected error. The IME block can use a MAC in the received data to detect the uncorrected error as a MAC verification failure, as described herein. The error detection circuit 506 can differentiate errors caused by an attack or an uncorrected error caused by the cache line experiencing reliability issues, as described herein. The error detection circuit 506 can send a notification to the host or fabric manager via the memory controller 512 or the management processor 508.

In another embodiment, the integrated circuit 502 can include an encryption circuit that can encrypt data being stored in the one or more volatile memory devices or one or more non-volatile memory devices coupled to the management processor 508 via a third interface 514. In another embodiment, one or more non-volatile memory devices are coupled to a second memory controller of the integrated circuit 502.

In another embodiment, the integrated circuit 502 is a processor that implements the CXL™ standard and includes the error detection circuit 506 and memory controller 512. In another embodiment, the integrated circuit 502 can include more or fewer interfaces than three.

In at least one embodiment, the management processor 508 can transfer the encrypted data in the persistent storage memory back to the DRAM to be accessible by the host. This can be performed in response to a restore operation or when power is restored automatically. When transferring data to the DRAM from the persistent storage memory, the encrypted data is accessed by the management processor 508 and written back to the DRAM. If the keys are encrypted and stored in persistent storage memory, the keys can be decrypted and used to decrypt the encrypted DRAM contents when accessed by the host. The host's data can be securely transferred to the DRAM from persistent storage memory without being accessible by the management processor 508 and without exposing the host's data on lines between an external NVM controller and the SoC. If the encrypted data was encrypted a second time for storage in the persistent storage memory where the NVM storage encryption key is recalled from persistent storage memory, the IME keys could also be restored. In at least one embodiment, the keys are decrypted and checked for integrity (MAC) as part of the flow.

Figure 6:
FIG. 6 is a flow diagram of a method of detecting an uncorrected error and differentiating the error as having been caused by a MAC verification failure caused by an ECC escape or an attack on memory, according to at least one embodiment.
Figure 6:
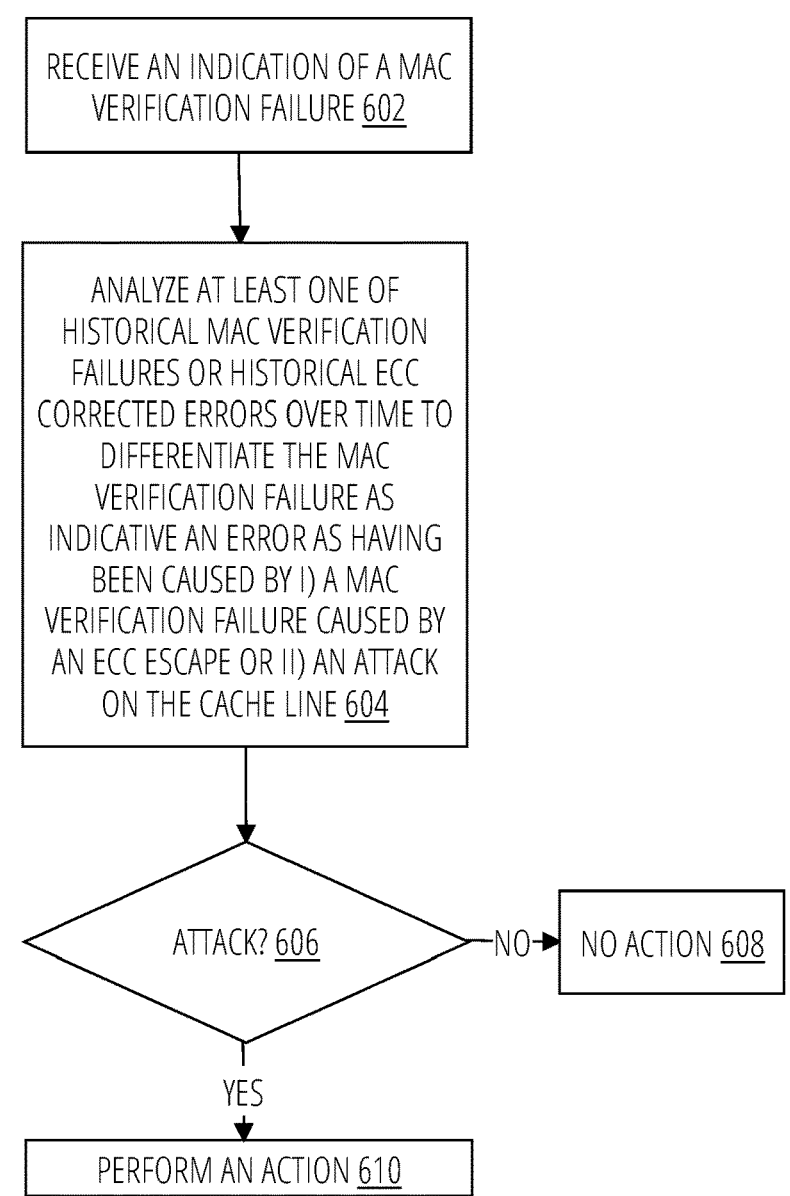

FIG. 6 is a flow diagram of a method 600 of detecting an uncorrected error and differentiating the error as having been caused by a MAC verification failure caused by an ECC escape or an attack on memory, according to at least one embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by the memory buffer device 102 of FIG. 1, a memory expansion device, a memory module 110 of FIG. 1, an integrated circuit having the IME block 106, the ECC block 104, and the security logic 108 of FIG. 1, or the like.

Referring to FIG. 6, the method 600 begins with the processing logic receiving an indication of a MAC verification failure (block 602). The indication can be received from an IME block. The MAC can be associated with cache line data. The processing logic analyzes at least one of the historical MAC verification failures or historical ECC corrected errors over time to differentiate the MAC verification failure as indicating an error as having been caused by i) a MAC verification failure caused by an ECC escape or ii) an attack on the cache line (block 604). The processing logic performs an action responsive to the error as having been caused by the attack (block 606). The action can be remedial or preventative in response to a detected attack. The action performed can be specified by a policy defined by a host or a fabric manager. The processing logic can perform other operations as described herein.

It is to be understood that the above description is intended to be illustrative and not restrictive. Many other implementations will be apparent to those of skill in the art upon reading and understanding the above description. Therefore, the disclosure's scope should be determined with reference to the appended claims, along with the full scope of equivalents to which such claims are entitled.

In the above description, numerous details are set forth. It will be apparent, however, to one skilled in the art that aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A memory buffer device comprising:
an error correction code (ECC) block to detect and correct errors in cache lines read from a dynamic random access memory (DRAM) device; and
an in-line memory encryption (IME) block to generate a message authentication code (MAC) for each cache line to provide cryptographic integrity for accesses to the respective cache line; and
security logic coupled to the ECC block and the IME block, wherein the security logic is to:
track historical ECC corrected errors at cache line granularity;
detect an error, uncorrected by the ECC block, in a cache line using a MAC of the cache line;
differentiate the error as caused by i) a MAC verification failure caused by an ECC escape or ii) an attack on the cache line, by analyzing at least one of historical MAC verification failures or the historical ECC corrected errors overtime; and
perform an action responsive to the error as caused by the attack, wherein the security logic, responsive to the error being detected, is to:
write a pattern to the cache line; and
read the pattern from the cache line to test the cache line, wherein a match between the read pattern and the written pattern indicates that the error is caused by the attack.

2. The memory buffer device of claim 1, wherein the security logic is to migrate the cache line from a first physical location to a second physical location for subsequent monitoring.

3. The memory buffer device of claim 2, wherein migration of the cache line from the first physical location to the second physical location does not change an address used by a connected host.

4. The memory buffer device of claim 1, wherein the security logic is to rearrange cache lines of the DRAM device for subsequent monitoring.

5. The memory buffer device of claim 1, further comprising a data structure associated with the security logic, wherein the data structure is to store information about the at least one of the historical MAC verification failures or the historical ECC corrected errors over time.

6. The memory buffer device of claim 5, wherein the information identifies an address of the cache line, a timestamp of the error, and an error type.

7. The memory buffer device of claim 5, wherein the data structure is a first-in-first-out (FIFO) buffer to store a last N number of the historical MAC verification failures, where N is a positive integer greater than zero, and wherein the security logic is to query the FIFO buffer responsive to the error being detected in the cache line.

8. The memory buffer device of claim 5, wherein the data structure is to store the information at a cache line granularity or a page granularity.

9. The memory buffer device of claim 1, wherein the security logic is to:
write first data to the cache line, wherein the first data is a known pattern;
read second data from the cache line;
determine whether the second data and the first data match; and
determine the error as having been caused by the attack on the cache line responsive to the first data and the second data matching.

10. The memory buffer device of claim 1, further comprising a data structure to track a number of corrections to the cache line.

11. The memory buffer device of claim 1, wherein the security logic is to track a number of corrections to the cache line as a value in the cache line.

12. The memory buffer device of claim 1, further comprising:
a Compute Express Link (CXL) controller coupled to the IME block and one or more hosts or a fabric manager;
a memory controller coupled to the ECC block and the DRAM device; and
a management processor coupled to the CXL controller.

13. A memory buffer device comprising:
an in-line memory encryption (IME) circuit to detect an error in a message authentication code (MAC) associated with data stored in volatile memory coupled to the memory buffer device; and
security logic coupled to the IME circuit, wherein the security logic is to:
track information about historical MAC verification failures and historical ECC corrected errors at cache line granularity; and
differentiate the error between a first type of error caused by an attack on the volatile memory and a second type of error caused by an uncorrected error, wherein the security logic, responsive to the error being detected, is to:
write a pattern to a cache line associated with the error; and read the pattern from the cache line to test the cache line, wherein a match between the read pattern and the written pattern indicates that the error is caused by the attack.

14. The memory buffer device of claim 13, further comprising:
an error correction code (ECC) circuit coupled to the IME circuit, the ECC circuit to detect up to a first specified number of errors in the data and correct up to a second specified number of errors in the data using ECC information stored in connection with the data;
a memory controller coupled to the ECC circuit and the volatile memory;

a controller coupled to the IME circuit and one or more hosts or a fabric manager, the controller to support a remote memory protocol; and a management processor coupled to the controller.

15. The memory buffer device of claim 14, further comprising a System on Chip (SoC) comprising the IME circuit, the ECC circuit, the memory controller, the controller, and the management processor.

16. A memory module that supports a remote memory protocol, the memory module comprising:

one or more volatile memory devices;

an encryption circuit to generate a message authentication code (MAC) to be stored with each cache line and verify the MAC when accessing the respective cache line;

an error correction code (ECC) circuit to generate ECC information to be stored with each cache line, wherein the ECC circuit is to detect up to a first specified number of errors in a cache line and correct up to a second specified number of errors in the cache line using the ECC information; and security logic coupled to the encryption circuit and the ECC circuit, wherein the security logic is to:

track historical ECC corrected errors at cache line granularity;

detect an error, uncorrected by the ECC circuit, in a first cache line using a first MAC of the first cache line;

determine whether the error is caused by an attack on the first cache line or a MAC verification failure caused by an ECC escape; and perform an action responsive to the error being caused by the attack, wherein the security logic, responsive to the error being detected, is to:

write a pattern to the first cache line; and read the pattern from the first cache line to test the first cache line, wherein a match between the read pattern and the written pattern indicates that the error is caused by the attack.

17. The memory module of claim 16, further comprising:

a memory controller coupled to the ECC circuit and the one or more volatile memory devices; and a controller coupled to the encryption circuit and one or more hosts.

18. The memory module of claim 16, further comprising:

a memory controller coupled to the ECC circuit and the one or more volatile memory devices;

a controller coupled to the encryption circuit; and a management processor coupled to the controller and a fabric manager.

* * * * *